Nov. 17, 1931.  P. W. HOSHOR  1,832,706
DOWEL PIN
Filed Dec. 4, 1929
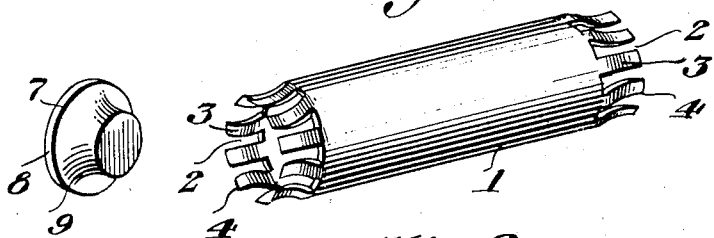
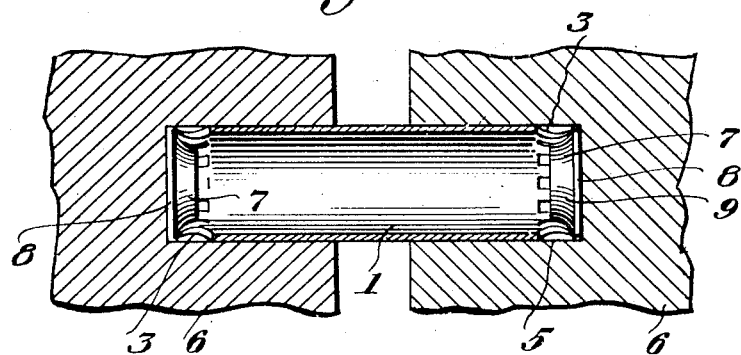
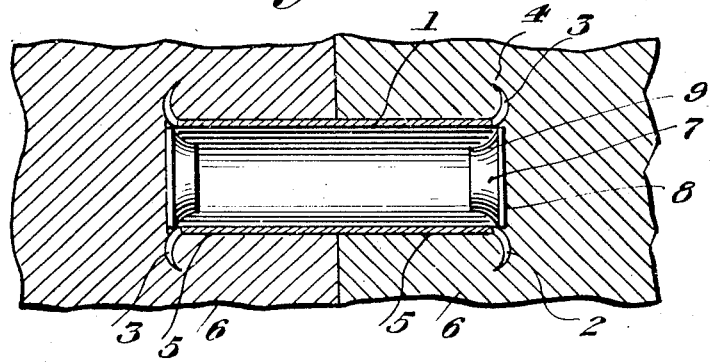
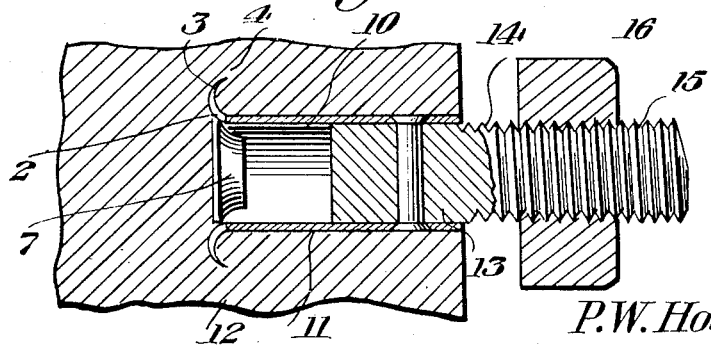
P. W. Hoshor INVENTOR
BY *Victor J. Evans*
ATTORNEY Patented Nov. 17, 1931

1,832,706

UNITED STATES PATENT OFFICE

PERRY W. HOSHOR, OF ALBUQUERQUE, NEW MEXICO

DOWEL PIN

Application filed December 4, 1929. Serial No. 411,659.

This invention relates to improvements in dowels and has as one of its objects to provide a dowel pin by means of which two pieces of wood may be joined merely by a compression of the pieces toward each other, and, also, a dowel to provide a means whereby a member may be secured to a wooden support by a nut associated with a threaded shank extending from the dowel.
Another object of the invention is to so construct the dowel that when the parts, which it is to connect, are forced together, the ends of the dowel will become so firmly anchored in the parts as to preclude any withdrawal thereof.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views and in which:—

Figure 1 is a perspective view illustrating the dowel embodying the invention, the component parts thereof being shown separated.
Figure 2 is a view illustrating the initial arrangement of the parts of the dowel in sockets in two wooden parts to be connected.

Figure 3 is a longitudinal sectional view illustrating the dowel anchored and the parts connected face to face.

Figure 4 is a similar view illustrating a modified form of the invention, to be used on wood or iron.

In the embodiment of the invention shown in Figures 1, 2 and 3 of the drawings, the dowel pin is indicated by the numeral 1 and the same is formed of metal and is of tubular, cylindrical form. The dowel pin is provided at each end with a number of incisions 2 providing at each end of the pin an annular series of prongs 3, and as shown in Figures 1 and 2 of the drawings, these prongs are curved inwardly from their points of juncture with the body of the pin to their piercing points, the said prongs being of gradually decreasing thickness from their ends which are integral with the body of the pin, to their outer ends so that their outer ends, which are indicated by the numeral 4, are sharp. These ends normally lie within the circumference of the body of the pin so that the two ends of the pin may be fitted readily into recesses 5 bored in the faces of the wood pieces 6 which are to be united.

In connection with the pin there are provided two expanders which are indicated by the numeral 7, and each expander comprises a body of metal having a circular base portion 8, and from this base portion the body has its surface curved inwardly and outwardly, as indicated by the numeral 9 as to provide a circumferentially curved surface against which the threaded end portions of the prongs 3 are adapted to seat when the ends of the pin 1 are inserted into the sockets 5, it being understood that the expanders 7 are fitted into the sockets so as to seat, at their portions 8 against the inner ends of the sockets.

After the parts comprising the dowel have been assembled in the manner shown in Figure 2 of the drawings the two wood pieces 6 are forced together and due to the peculiar formation of the surface portion 9 of the expanders and to the curvature of the prongs 3, the prongs will ride over the surface portions and be spread outwardly with respect to the axis of the dowel pin body, and will penetrate the wood pieces by entering the same on lines radial to the walls of the inner ends of the sockets 5, as clearly shown in Figure 3 of the drawings, and in this manner the parts are very securely united.

Figure 4 of the drawings illustrates a modification in which a hollow dowel which corresponds to substantially one-half of the dowel 1, above described, is adapted to be anchored in a socket 11 in a wood piece 12, and anchored in the open outer end of the dowel body as the cylindrical end 13 of a screw 14, the threads of which are indicated by the numeral 15, a nut 16 being fitted to the threaded end of the screw and adapted to secure, against the wood piece 2, any article or object fitted over the threaded part of the screw between the nut and said surface.

What I claim is:—

A dowel comprising a tubular body having closely arranged bendable prongs, said prongs being outwardly tapered from their inner sides and with outwardly curved tips, and a disk-like inverted truncated conical expander of a thickness substantially equal to the length of said prongs and concavely curved from its inner to the outer face thereof, whereby on forcing the expanders inwardly between the prongs the same will be bent laterally and lie substantially flush with the outer face of the expanders.

In testimony whereof I affix my signature.

PERRY W. HOSHOR.